(12) United States Patent
Giesmann et al.

(10) Patent No.: US 7,681,657 B2
(45) Date of Patent: Mar. 23, 2010

(54) DEBRIS GUARD

(75) Inventors: Kendall Lee Giesmann, Waverly, IA (US); Robert Lee Wood, Jr., Waterloo, IA (US); Dennis Aaron Bowman, Cedar Falls, IA (US)

(73) Assignee: Deere & Company, Moline, IL (US)

( * ) Notice: Subject to any disclaimer, the term of this patent is extended or adjusted under 35 U.S.C. 154(b) by 1334 days.

(21) Appl. No.: 11/008,771

(22) Filed: Dec. 9, 2004

(65) Prior Publication Data

US 2006/0145449 A1 Jul. 6, 2006

(51) Int. Cl.
*E02F 3/85* (2006.01)
(52) U.S. Cl. .......................................... 172/813; 92/53
(58) Field of Classification Search ................ 172/813, 172/272, 439; 403/50, 51; 267/119, 120; 92/53
See application file for complete search history.

(56) References Cited

U.S. PATENT DOCUMENTS

| | | | | |
|---|---|---|---|---|
| 2,541,964 A * | 2/1951 | Hennings | ...................... | 74/586 |
| 3,381,987 A * | 5/1968 | Husen | ........................... | 403/51 |
| 3,384,397 A * | 5/1968 | Wehner | ....................... | 403/140 |
| 3,472,540 A * | 10/1969 | Gottschald | ................... | 403/51 |
| 3,502,152 A * | 3/1970 | Johnson | ....................... | 172/40 |
| 3,674,096 A | 7/1972 | Berg | ............................ | 172/805 |
| 3,997,986 A * | 12/1976 | Black et al. | ................... | 37/419 |
| 4,111,268 A * | 9/1978 | Frisbee | ........................ | 172/813 |
| 4,237,986 A | 12/1980 | Frisbee | ........................ | 172/805 |
| 4,527,803 A * | 7/1985 | Rose | ........................... | 277/315 |
| 4,936,193 A * | 6/1990 | Stoll | ............................. | 92/51 |
| 4,949,593 A * | 8/1990 | Vignoli et al. | ................ | 74/566 |
| 5,074,390 A * | 12/1991 | Fuhrmann et al. | ....... | 188/322.12 |
| 5,074,706 A | 12/1991 | Paulos | ......................... | 404/12 |
| 5,152,351 A * | 10/1992 | Rieger | ........................ | 172/813 |
| 5,386,652 A * | 2/1995 | Ramun | ........................ | 37/406 |
| 6,145,181 A * | 11/2000 | Murata et al. | ................. | 29/450 |
| 6,149,180 A * | 11/2000 | Haws | ..................... | 280/479.1 |
| 6,321,851 B1 * | 11/2001 | Weiss et al. | ................. | 172/444 |
| 6,347,671 B1 * | 2/2002 | Stiller et al. | ................ | 172/439 |
| 6,364,093 B1 | 4/2002 | LaBolt | ....................... | 198/775 |
| 6,405,806 B1 * | 6/2002 | Bernhardt et al. | ........... | 172/272 |
| 6,843,005 B2 * | 1/2005 | Clapper | ....................... | 37/406 |
| 6,866,441 B2 * | 3/2005 | Yokoyama | .................... | 403/50 |
| 2004/0200624 A1 | 10/2004 | Ochi et al. | ..................... | 172/4 |

* cited by examiner

*Primary Examiner*—Thomas B Will
*Assistant Examiner*—Jamie L McGowan

(57) ABSTRACT

A debris guard is provided for an assembly having a variable length cylinder coupled to a housing. The cylinder has a barrel pivotally coupled to the housing and a rod which extends and retracts with respect to The barrel. The debris guard includes a body of flexible material filling a space between the barrel and the wall of the housing and preventing debris from entering the space. The body compresses as the barrel moves toward the housing wall and expands as the barrel moves away from the housing wall. The body of flexible material is bonded to a surface of the barrel and to the wall of the housing. The flexible material is molded and comprises a closed cell elastomeric material.

5 Claims, 3 Drawing Sheets

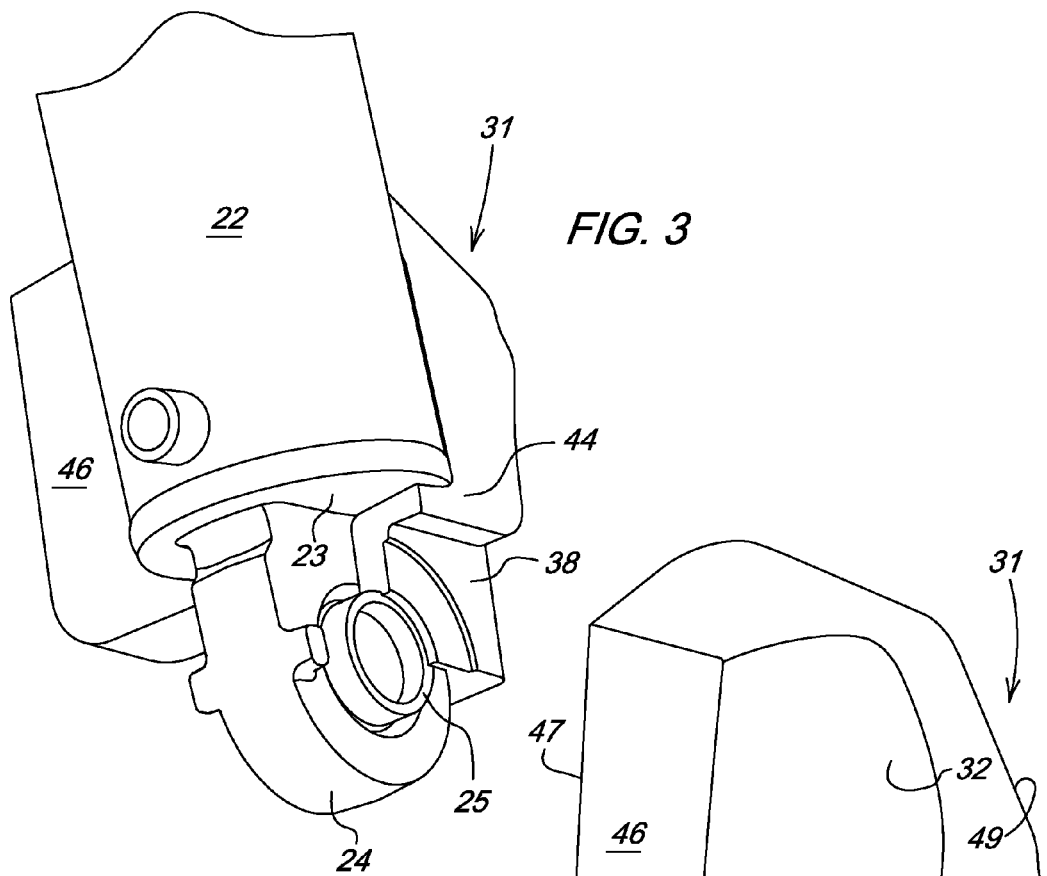
FIG. 3
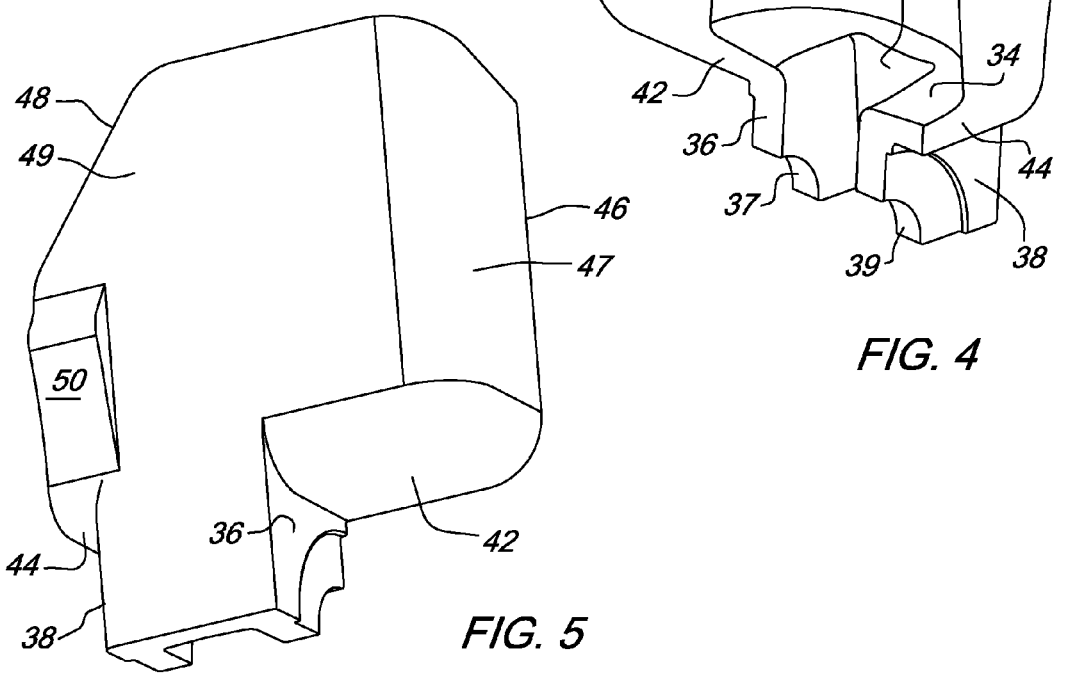
FIG. 4
FIG. 5

DEBRIS GUARD

BACKGROUND

The present invention relates to a debris guard for keeping debris from between a housing and a cylinder pivotal with respect to the housing.

Some agricultural tractors with 3-point hitch systems include hydraulic hitch cylinders with one end coupled to a bell crank and a second end coupled to a fixed pivot adjacent to a tractor housing, such as the differential case. Debris can become trapped between the barrel of the cylinder and the outer wall of the housing. As the cylinder extends and retracts, this debris can become packed and can exert a side load on the cylinder which can cause cylinder seal failure and leakage, and/or pin or bearing wear or failure. Movable shields and bellows have been used in attempts to avoid this problem. However, shields may still allow small debris to become trapped, and bellows can tear and allow debris to enter and become trapped.

SUMMARY

Accordingly, an object of this invention is to provide a debris guard for preventing debris from interfering with a cylinder mounted on a housing.

These and other objects are achieved by the present invention, wherein a debris guard is provided for an assembly having a variable length cylinder coupled to a housing. The cylinder has a barrel pivotally coupled to the housing and a rod which extends and retracts with respect to the barrel. The debris guard includes a body of flexible material filling a space between the barrel and the wall of the housing and preventing debris from entering the space. The body compresses as the barrel moves toward the housing wall and expands as the barrel moves away from the housing wall. The body of flexible material is bonded to a surface of the barrel and to the wall of the housing. The flexible material is molded and comprises a closed cell elastomeric material.

BRIEF DESCRIPTION OF THE DRAWINGS

FIG. 3 is a perspective view of the present invention installed on a cylinder, but removed from the housing;

FIG. 4 is a perspective view of the debris guard of FIG. 1;

FIG. 5 is another perspective view of the debris guard of FIG. 1.

DETAILED DESCRIPTION

Figure 1:
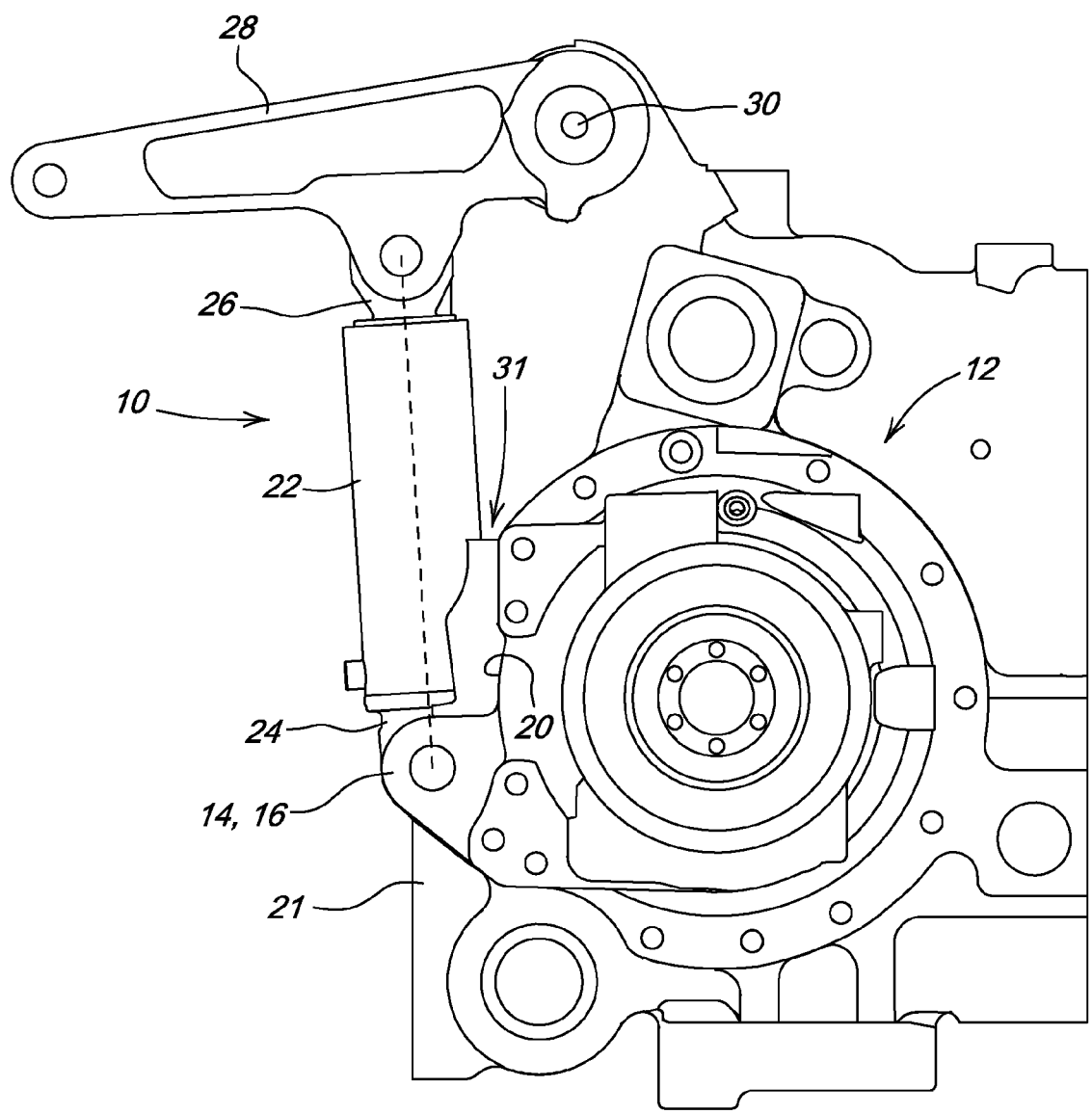
FIG. 1 is a side view of a portion of an agricultural tractor showing a debris guard according to the present invention installed between a hydraulic cylinder and a housing.
Figure 2:
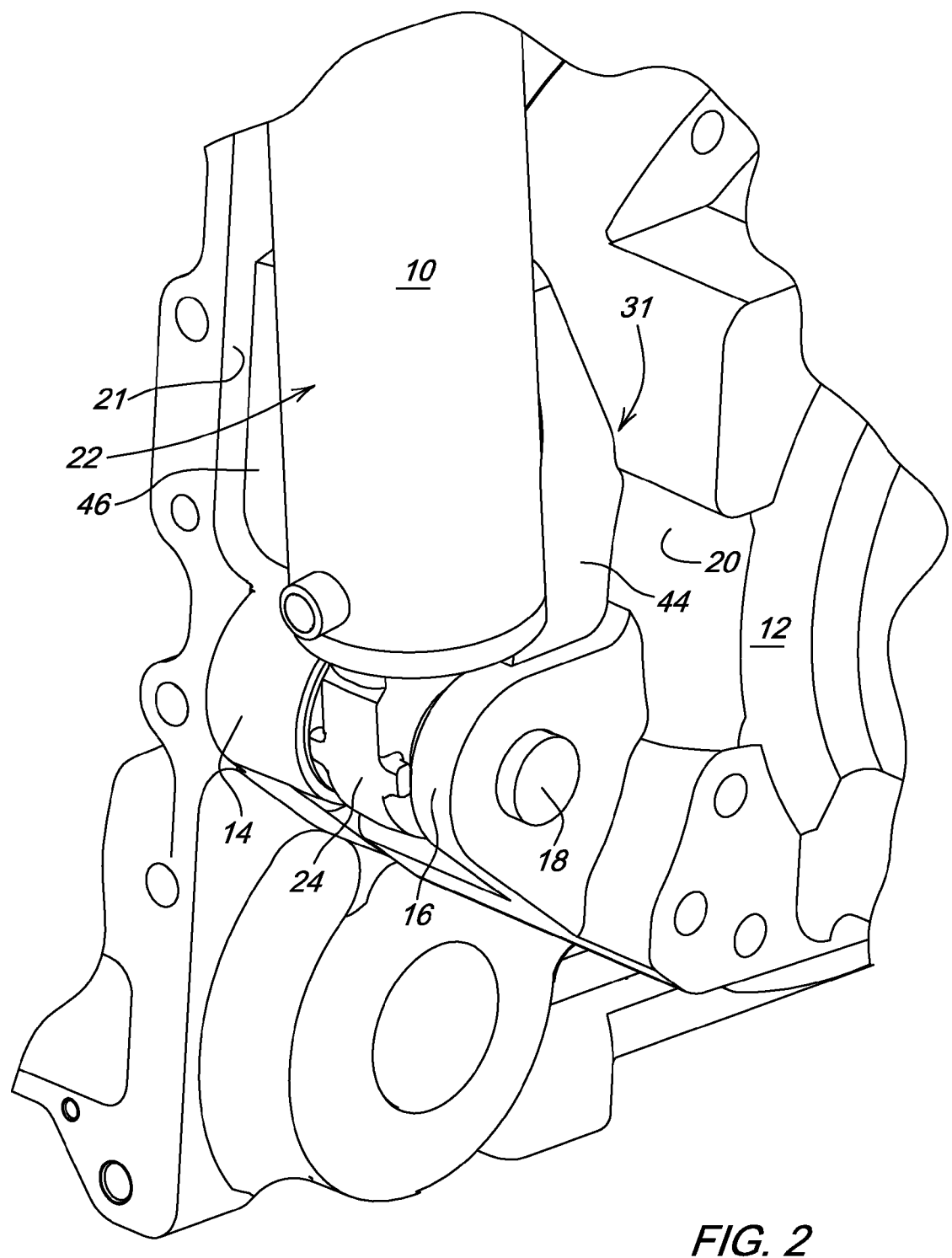
FIG. 2 is a perspective installed view of the present invention.

Referring to the Figures, a connecting member or link 10 is pivotally coupled to a differential case or housing 12 of an agricultural tractor (not shown). The member 10 is preferably an adjustable length connecting member, such as a hydraulic cylinder of a 3-point hitch system. The housing 12 includes a pair of support tabs 14, 16 which receive and support a pivot pin 18. The housing forms a generally rearward facing wall 20 and a side facing wall 21, both of which may be simple or complex, and both of which face generally towards the cylinder 10.

The link 10 includes a barrel 22 and a mounting ear 24 which projects from a lower end of the barrel. As seen in FIG. 3, a cylindrical hub 25 projects from ear 24. Ear 24 and hub 25 pivotally receives pin 18. The cylinder also includes a rod 26 which extends and retracts from the barrel 22. An end of the rod 26 may be coupled to a movable member 28 (such as a bellcrank of a 3-point hitch mechanism) which is pivotal about a fixed pivot 30.

According to the present invention, a debris seal or guard 31 fills a portion of the space between the barrel 22 and the housing wall 20. The guard 31 has a body of flexible material, preferably a closed cell elastomeric material.

The rear side of the guard 31 includes a cylindrical recess 32, the surface of which conforms to and is bonded to the barrel 22. The recess 32 ends at a generally U-shaped end wall 34 which conforms with and engages a bottom end surface 23 of the barrel 22. Guard 31 forms a pair of legs 36 and 38 which project away from recess 32 and end wall 34. Legs 36 and 38 form a generally rectangular slot 40 therebetween which receives barrel mounting ear 24. Legs 36 and 38 are formed to fill the space between the wall 20, barrel 22, tabs 14, 16 and ear 24. Legs 36 and 38 form curved surfaces 37 and 39, respectively. Surfaces 37 and 39 engage and seal against the outer surface of hub 25.

Guard 31 also includes members 42 and 44 which project laterally away from the upper ends of legs 36, 38, respectively. Members 42 and 44 engage an upper surface of tabs 14 and 16, respectively. Guard 31 forms a side 46 which forms a wall 47 which engages housing wall 21 and which fills the space between barrel 22 and housing wall 21. Guard 31 also includes a front side 48 which forms a front wall 49 which engages housing wall 20 and which fills the space between barrel 22 and housing wall 20. As seen in FIG. 5, a raised member 50 projects outwardly from front wall and is received in a corresponding recess (not shown) in the wall 20.

Preferably, the guard 31 is bonded or glued only to the barrel 22, but is shaped and sized so that walls 46 and 48 are always pressed into engagement with housing walls 21 and 20, respectively. As a result, debris guard 31 prevents debris from entering into the space between the cylinder 10 and the walls of the housing 12.

While the present invention has been described in conjunction with a specific embodiment, it is understood that many alternatives, modifications and variations will be apparent to those skilled in the art in light of the foregoing description. For example, the shape and size of the guard can be changed or adapted to fit between different cylinders and links and different shaped housings. Accordingly, this invention is intended to embrace all such alternatives, modifications and variations which fall within the spirit and scope of the appended claims.

We claim:

1. A debris guard in an assembly having a variable length cylinder coupled to a housing, the cylinder having a barrel and a rod which extends and retracts along an axis with respect to the barrel, the barrel having a mounting ear pivotally coupled to the housing, the debris guard comprising:

a body of flexible material filling a space between the barrel and the housing and preventing debris from entering said space, the body engaging a side wall of the barrel and being compressed by the side wall of the barrel in a direction perpendicular to the axis as the barrel moves toward the housing wall and expanding as the barrel moves away from the housing wall, the body having a cylindrical recess, the recess having a surface which engages the side wall of the barrel.

2. A debris guard in an assembly having a variable length cylinder coupled to a housing, the cylinder having a barrel and a mounting ear projecting from an end of the barrel and pivotally coupled to the housing and a rod which extends and retracts along an axis with respect to the barrel, the debris guard comprising:

a body of flexible material filling a space between the barrel and the wall of the housing and preventing debris from entering space, the body being separated from the rod, the body engaging a side wall of the barrel and being compressed by the side wall of the barrel in a direction perpendicular to the axis as the barrel moves toward the housing wall and expanding as the barrel moves away from the housing wall, the body having a cylindrical recess, the recess having a surface which engages the side wall of the barrel, the recess terminating at a generally U-shaped end wall, and the body forming a pair of legs which project away from the recess, the legs forming a slot which receives a portion of the mounting ear.

3. The debris guard of claim 2, wherein:
the body of flexible material is bonded to a surface of the barrel and the wall of the housing.

4. The debris guard of claim 2, wherein:
the flexible material is molded and comprises a closed cell elastomeric material.

5. The debris guard of claim 2, wherein:
the slot has a bottom surface which faces in a direction which is perpendicular to a main axis of the cylinder along which the cylinder extends and retracts.

* * * * *